United States Patent [19]

Rao

[11] Patent Number: 5,038,315

[45] Date of Patent: Aug. 6, 1991

[54] MULTIPLIER CIRCUIT

[75] Inventor: Sailesh K. Rao, Lakewood, N.J.

[73] Assignee: AT&T Bell Laboratories, Murray Hill, N.J.

[21] Appl. No.: 351,881

[22] Filed: May 15, 1989

[51] Int. Cl.[5] .............................................. G06F 7/52
[52] U.S. Cl. ...................................... 364/760; 364/757
[58] Field of Search ...................... 364/760, 759, 757

[56] References Cited

U.S. PATENT DOCUMENTS

| | | | |
|---|---|---|---|
| 3,627,999 | 12/1971 | Iverson | 364/759 |
| 3,761,699 | 9/1973 | Sather | 364/759 |
| 4,538,239 | 8/1985 | Magar | 364/759 |
| 4,575,812 | 3/1986 | Kloker et al. | 364/760 |
| 4,748,582 | 5/1988 | New et al. | 364/757 |
| 4,791,601 | 12/1988 | Tanaka | 364/760 |
| 4,868,778 | 9/1989 | Disbrow | 364/757 |

Primary Examiner—David H. Malzahn
Attorney, Agent, or Firm—Ronald D. Slusky

[57] ABSTRACT

In a multiplier for binary numbers represented in two's complement notation, the need to perform sign-bit extension in order to combine the partial products is avoided by representing the value represented by the sign bits of all the partial products as a two's complement number in its own right. The bits of that number, rather than the original sign bits, are then used in the partial product addition. Since (as with all two's complement numbers) all the bits of the sign-bit-value word are guaranteed to have positive significance (except for the left-most one), the digits of the partial products can then be direcly added without the need for sign bit extension.

2 Claims, 2 Drawing Sheets

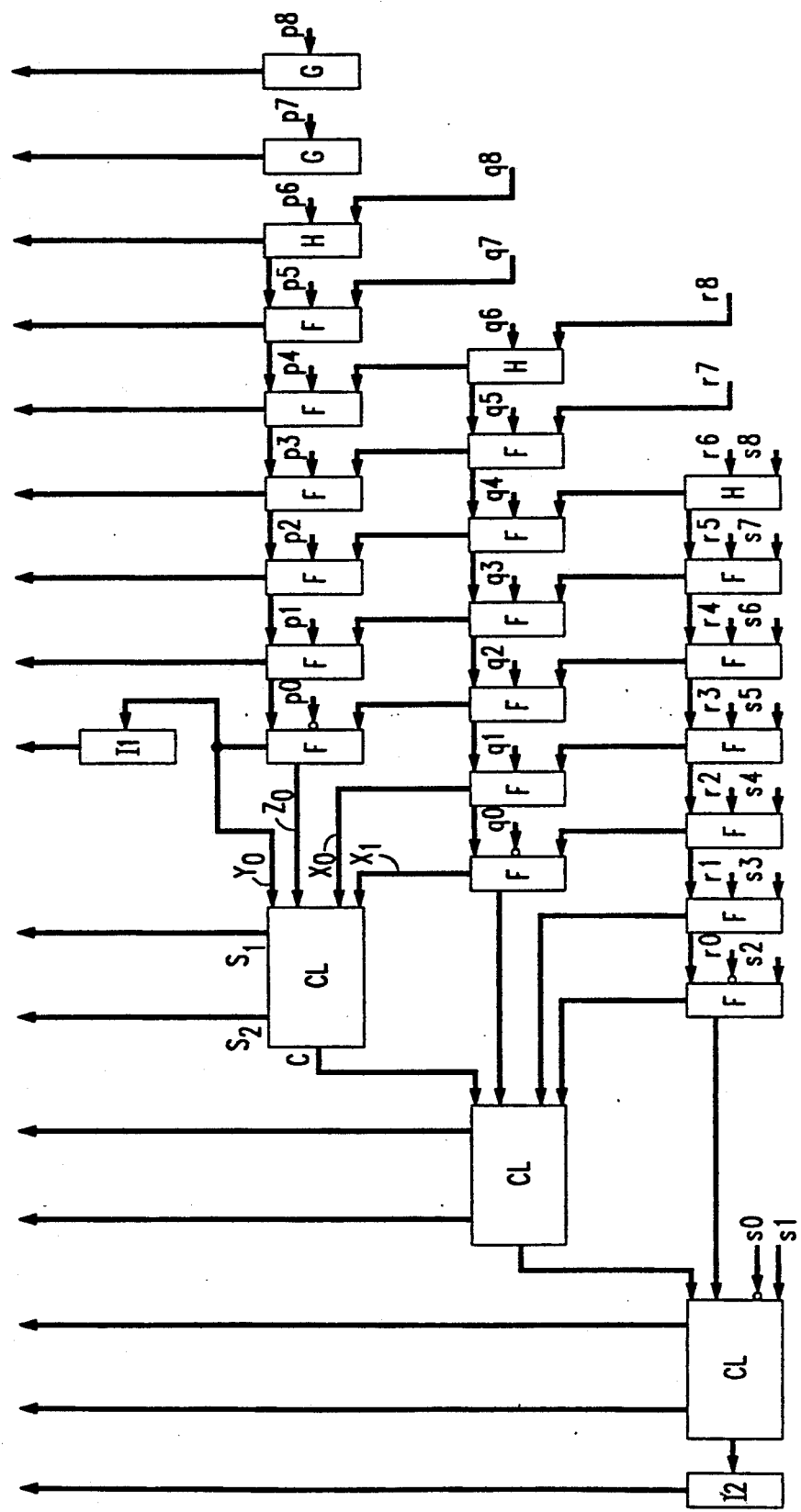

MULTIPLIER CIRCUIT

BACKGROUND OF THE INVENTION

The present invention relates to a technique for multiplying binary numbers.

Circuits for multiplying binary numbers require a relatively large number of circuit elements and thus take up a fair amount of chip area when fabricated on an integrated circuit. For this reason, an ongoing goal of integrated circuit designers is to find ways to implement a multiplier circuit with fewer and fewer circuit elements.

For example, a technique that is in widespread use is to represent one of the two numbers being multiplied using so-called modified Booth encoding. This approach reduces, by a factor of two, the number of partial products generated by the multiplier, thereby reducing the amount of circuitry needed to combine the partial products in arriving at the final product. Unfortunately, the fact that signed binary numbers are typically represented using two's complement notation—at least when being operated on arithmetically—significantly dulls the above-described advantage of modified Booth encoding because of the need to perform so-called sign-bit extension of the partial products before they can be combined (as explained in further detail hereinbelow).

SUMMARY OF THE INVENTION

In accordance with the invention—the use of which is particularly applicable to the multiplication of numbers represented in two's complement notation—the need to perform sign-bit extension in order to combine the partial products is avoided by representing the value represented by the sign bits of all the partial products as a two's complement number in its own right. The bits of that number—referred to herein as the "sign-bit-value" word—rather than the original sign bits, are then used in the partial product addition. Since (as with all two's complement numbers) all the bits of the sign-bit-value word are guaranteed to have positive significance (except for the left-most one), the digits of the partial products can then be directly added without the need for sign bit extension. Implementation of this approach requires significantly less circuit area—as much as 20 percent less—than multipliers known heretofore.

BRIEF DESCRIPTION OF THE DRAWING

In the drawing,

FIG. 2 is a block diagram of the remainder of the multiplier—a partial product combining circuit—which embodies the principles of the present invention.

DETAILED DESCRIPTION

Figure 1:
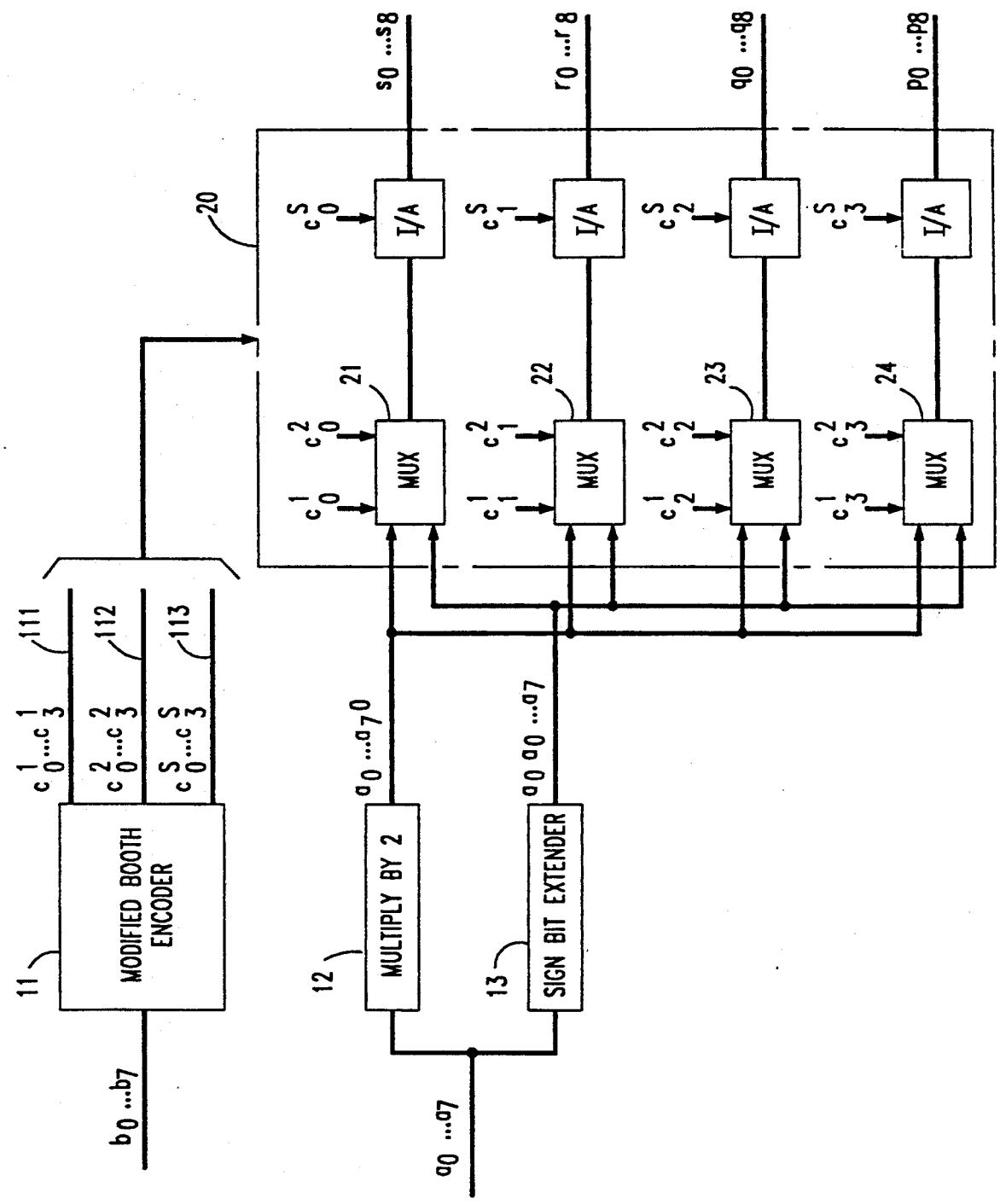
FIG. 1 is a block diagram of the partial product generator of a multiplier circuit employing modified Booth encoding.

In order to understand the invention, it will be helpful to begin by reviewing binary multiplication generally.

Binary numbers are typically multiplied very much like decimal numbers. Specifically, each digit of each word is multiplied by each digit of the other word and these resulting partial products are then added, taking place significance into account. Thus two 8-bit binary numbers $a_0a_1a_2a_3a_4a_5a_6a_7$ and $b_0b_1b_2b_3b_4b_5b_6b_7$ can be multiplied as follows:

$$
\begin{array}{r}
a_0\ a_1\ a_2\ a_3\ a_4\ a_5\ a_6\ a_7 \\
b_0\ b_1\ b_2\ b_3\ b_4\ b_5\ b_6\ b_7 \\
\hline
h_0\ h_1\ h_2\ h_3\ h_4\ h_5\ h_6\ h_7 \\
i_0\ i_1\ i_2\ i_3\ i_4\ i_5\ i_6\ i_7\phantom{\ h_7} \\
j_0\ j_1\ j_2\ j_3\ j_4\ j_5\ j_6\ j_7\phantom{\ h_7\ h_7} \\
\cdots\ \cdots\ \cdots\ \cdots \\
\hline
o_0\ o_1\ o_2\ o_3\ o_4\ o_5\ o_6\ o_7
\end{array}
\quad (1)
$$

[sum of the partial products]

where each of the terms in the eight partial products is the product of a particular one of the a's with a particular one of the b's. Thus, for example, $h_7 = a_7 \cdot b_7$, $j_6 = b_4 \cdot a_6$, etc.

In actuality, no actual multiplications need to be performed because, since the b's are all either "0" or "1", each one of the partial products $h_0h_1h_2h_3h_4h_5h_6h_7$, $i_0i_1i_2i_3i_4i_5i_6i_7$, etc., is either equal to 00000000 or to $a_0a_1a_2a_3a_4a_5a_6a_7$.

In order to reduce the number of multiplications and additions needed to multiply two binary numbers, we can rewrite the multiplier using so-called modified Booth encoding wherein the binary number $b_0b_1 \ldots b_7$, assumed to be in two's complement notation, can be expressed as a number $C_0\ C_1\ C_2\ C_3$ where $$C_i = -2b_{(2j)} + b_{(j+1)} + b_{(j+2)}$$

and where it can be shown that $$C_i = 0, \pm 1, \text{ or } \pm 2.$$

Thus, the above multiplication problem (1) can be rewritten as $$
\begin{array}{r}
a_0\ a_1\ a_2\ a_3\ a_4\ a_5\ a_6\ a_7 \\
C_0\quad C_1\quad C_2\quad C_3 \\
\hline
P_0\ P_1\ P_2\ P_3\ P_4\ P_5\ P_6\ P_7\ P_8 \\
q_0\ q_1\ q_2\ q_3\ q_4\ q_5\ q_6\ q_7\ q_8 \\
r_0\ r_1\ r_2\ r_3\ r_4\ r_5\ r_6\ r_7\ r_8 \\
s_0\ s_1\ s_2\ s_3\ s_4\ s_5\ s_6\ s_7\ s_8
\end{array}
\quad (2)
$$

[sum of the partial products]

from which it is apparent that many fewer additions are performed. Moreover, since $$C_i = 0, \pm 1, \text{ or } \pm 2,$$

the multiplication of the a's by the C's in (2) involves processing that is no more complicated than shifting and sign inverting. From an implementational standpoint, the use of modified Booth encoding is significant because the reduced number of additions translates directly into a reduced number of circuit elements needed, for example, to build a multiplier circuit on an integrated circuit chip. On the other hand, the way in which the partial products are added in accordance with conventional practice significantly dulls this advantage because the sign bits of the various partial products have different positional significances, thereby resulting in the need to do so-called sign-bit extension.

Specifically, consider the case where the binary numbers are written in two's complement notation, which is often the preferred way of representing them. In two's complement notation, the left-most bit represents the same magnitude as in a standard positive binary number, but it has a negative significance. Thus, for example, the number 1011 in two's complement notation is equal to decimal −5 because $$(-8)(1)+(4)(0)+(2)(1)+(1)(1)=-5$$

This characteristic of two's complement numbers must be taken into account in the course of adding the partial products when multiplying numbers in that form, because the terms in each column must all have the same significance sign-wise in order for them to be added, yet the various sign bits of the partial products have different positional significance and thus the terms in each column do not all have the same significance sign-wise.

Advantageously, this is an easy problem to solve from a mathematical standpoint because one of the properties of two's complement notation is that the left-most bit can be replicated, or "extended", to the left any desired number of times without changing the value of the number itself. Thus going further in the example above, we can rewrite (2) as:

$$\begin{array}{c} a_0\ a_1\ a_2\ a_3\ a_4\ a_5\ a_6\ a_7 \\ C_0\ \ C_1\ \ C_2\ \ C_3 \end{array} \quad (3)$$

$$\begin{array}{l} p_0\ p_0\ p_0\ p_0\ p_0\ p_0\ p_0\ p_1\ p_2\ p_3\ p_4\ p_5\ p_6\ p_7\ p_8 \\ q_0\ q_0\ q_0\ q_0\ q_0\ q_1\ q_2\ q_3\ q_4\ q_5\ q_6\ q_7\ q_8 \\ r_0\ r_0\ r_0\ r_1\ r_2\ r_3\ r_4\ r_5\ r_6\ r_7\ r_8 \\ s_0\ s_1\ s_2\ s_3\ s_4\ s_5\ s_6\ s_7\ s_8 \end{array} \longleftarrow \text{partial products}$$

[sum of the partial products]

and then add directly in columns to achieve the final product. Disadvantageously, however, carrying out this sign-bit extension requires a significant amount of circuitry.

In accordance with the invention, however, the need to do sign-bit extension is avoided. In particular, the value represented by the sign bits of all the partial products is represented as a two's complement number in its own right. The bits of that number—referred to herein as the "sign-bit-value" word—rather than the original sign bits, are then used in the partial product addition. Since (as with all two's complement numbers) all the bits of the sign-bit-value word are guaranteed to have positive significance (except for the left-most one), the digits of the partial products can then be directly added without the need for sign bit extension.

Turning, then, to the example presented in (2), the magnitude of the value of the sign bits $p_0$, $q_0$, $r_0$ and $s_0$ can be represented by the positive-valued two's complement number $$0\ s_0\ 0\ r_0\ 0\ q_0\ 0\ p_0\ 0\ 0\ 0\ 0\ 0\ 0\ 0.$$

The actual value represented by those sign bits is, however, a negative number. In order to invert the sign of a two's complement number, we invert the binary value of each bit and then add "1" to the result, thusly:

$$\begin{array}{r} 1\ \bar{s_0}\ 1\ \bar{r_0}\ 1\ \bar{q_0}\ 1\quad \bar{p_0}\quad 1\ 1\ 1\ 1\ 1\ 1\ 1\ 1 \\ +0\ 0\ 0\ 0\ 0\ 0\ 0\quad 0\quad 0\ 0\ 0\ 0\ 0\ 0\ 0\ 1 \\ \hline 1\ \bar{s_0}\ 1\ \bar{r_0}\ 1\ \bar{q_0}\ 1\ (\bar{p_0}+1)\ 0\ 0\ 0\ 0\ 0\ 0\ 0\ 0 \end{array}$$

The multiplication in (2) can thus be rewritten as $$\begin{array}{c} a_0\ a_1\ a_2\ a_3\ a_4\ a_5\ a_6\ a_7 \\ C_0\ \ C_1\ \ C_2\ \ C_3 \end{array} \quad (4)$$

-continued $$\begin{array}{l} \qquad\qquad\qquad 1\ (\bar{p_0}+1)\ p_1\ p_2\ p_3\ p_4\ p_5\ p_6\ p_7\ p_8 \\ \qquad 1\ \bar{q_0}\ q_1\quad q_2\quad q_3\ q_4\ q_5\ q_6\ q_7\ q_8 \\ \quad 1\ \bar{r_0}\ r_1\ r_2\ r_3\quad r_4\quad r_5\ r_6\ r_7\ r_8 \\ 1\ \bar{s_0}\ s_1\ s_2\ s_3\ s_4\ s_5\quad s_6\quad s_7\ s_8 \end{array} \longleftarrow \text{partial products}$$

[sum of the partial products]

where, again, all of the digits except for the left-most "1" in the last partial product have positive significance and can thus simply be added. The need for sign-bit extension is thus avoided and the multiplier can be implemented with fewer circuit elements than in prior art arrangements.

Turning now to FIG. 1, the partial product generator shown therein receives the two binary numbers $a_0 \ldots a_7$ and $b_0 \ldots b_7$ and generates the four partial products $p_0 \ldots p_8$, $q_0 \ldots q_8$, $r_0 \ldots r_8$ and $s_0 \ldots s_8$. (Although shown as appearing on a single lead, each multibit word or number actually appears on a set of parallel leads—one for each bit.)

In particular, $b_0 \ldots b_7$ is applied to modified Booth encoder 111 which is comprised of a straightforward array of logic gates and which generates signals on leads 111-113 representing the modified Booth encoded version of $b_0 \ldots b_7$, viz $C_0 \ldots C_3$. Specifically, leads 111 carry four bits $c_0^1$, $c_1^1$, $c_2^1$ and $c_3^1$ each of which is associated with a respective one of the modified Booth encoded digits $C_0$, $C_1$, $C_2$ and $C_3$ (hereinafter referred to as "the encoded digits"). Leads 112 (113) similarly carry four bits $c_0^2$, $c_1^2$, $c_2^2$ and $c_3^2$ ($c_0^s$, $c_1^s$, $c_2^s$ and $c_3^s$) each, again, associated with a respective encoded digit. Thus, each of the four encoded digits has three associated bits—one on each of leads 111-113.

The bits on leads 111 and 112 represent the magnitude of the associated encoded digit. In particular, if the magnitude of a particular encoded digit is zero, both of the associated bits on leads 111 and 112 have the value binary "0", whereas, if the encoded digit is unity (two), then the associated bits on leads 111 and 112 are, respectively, binary "1" and "0" ("0" and "1").

The bits on lead 113 represent the sign of the associated encoded digits—"0" for positive sign or zero and "1" for negative sign. Thus, for example, if the encoded digits $C_0$, $C_1$, $C_2$, and $C_3$ had the values $-1$, $-2$, $+1$ and 0, then the bits on leads 111-113 would be 1010, 0100 and 1100, respectively.

As will be realized from the discussion above, partial product has a value equal to either a) 0; b) $a_0 \ldots a_7$, its negative; or c) $a_0 \ldots a_7 0$ (i.e., twice $a_0 \ldots a_7$) or its negative. In furtherance of providing these partial product values, the partial product generator of FIG. 1 includes multiply-by-two circuit 12, which generates the 9-bit number $a_0 \ldots a_7 0$, and sign-bit extension circuit 13 which generates a 9-bit number $a_0\ a_0 \ldots a_7$, whose value is the same as $a_0 \ldots a_7$. (Representing this value as a 9-bit number rather than the original 8-bit version allows selector 20 (discussed below) to deal with a single word length—thereby minimizing its complexity). Depending on the values of the bits on leads 111-113, one, or neither, of these 9-bit words—or its invert—is gated onto each of the four output leads of selector 20 to provide the four partial products $p_0 \ldots p_8$, $q_0 \ldots q_8$, $r_0 \ldots r_8$ and $s_0 \ldots s_8$.

Specifically to this end, selector 20 includes four multiplexers (mux) 21-24 whose outputs feed inverters 25-29, respectively. Multiplexer 21 is controlled by bits $c_0^1$ and $c_0^2$; multiplexer 22 is controlled by bits $c_1^1$ and $c_1^2$; multiplexer 23 is controlled by bits $c_2^1$ and $c_2^2$; and multiplexer 24 is controlled by bits $c_3^1$ and $c_3^2$.

When the values of the two control bits of a multiplexer indicate that the value of the associated encoded digit is zero, the multiplexer provides 0 . . . 0 at its output. When they indicate that the encoded digit value has unity magnitude, the multiplexer gates $a_0 a_0 \ldots a_7$ to its output, and when they indicate that the encoded digit value has a magnitude of two, the multiplexer gates $a_0 \ldots a_7 0$ to its output.

Inverters/adders 25–28 are controlled by $c_0^s$, $c_1^s$, $c_2^s$ and $c_3^s$, respectively. If a particular one of those bits has the value binary "0", the associated inverter/adder passes the output of the associated multiplexer unchanged to the inverter/adder output, whereas, if the bit value is "1", the multiplexer output is inverted, i.e., has its sign changed and "1" is added to form the two's complement. As shown in the FIG., the four inverter/adder outputs are the partial products $p_0 \ldots p_8$, $q_0 \ldots q_8$, $r_0 \ldots r_8$ and $s_0 \ldots s_8$.

The partial products thus generated are combined by the partial product combining circuit of FIG. 2 embodying the principles of the present invention. The various outputs across the top of FIG. 2 are the bits of the final product.

Specifically, each box marked "G" in FIG. 2 is a simple gate which takes its single input and provides it at its output. Each box marked "H" is a half adder which receives two inputs—specifically, two particular partial sum digits—and outputs a "sum" bit and a "carry" bit depicted as emerging from the top and left side of the box, respectively. Each box marked "F" is a full adder which receives three inputs—two particular partial sum digits and a carry bit from a lower-order adder stage. As with the half adders, each full adder outputs a "sum" bit and a "carry" bit. The box labelled I1 is an inverter which, by virtue of inverting the output of the full adder that receives $p_0$, causes a "1" to be added thereto—that "1", it will be remembered, having arisen out of the sign-inversion procedure mentioned earlier. The carry bit resulting from this addition of "1" has the same value as the inverter input.

The three boxes labelled "CL" are identical carry look-ahead circuits each of which receives four explicit inputs. As shown for one of the carry look-ahead circuits, the four explicit inputs thereof are denoted $y_0$, $z_0$, ...0 and $x_1$, ..... $x_1$ having double the significance of the other inputs (reading from top to bottom). Each carry look-ahead circuit also has an implicit fifth input of value "1", this being the left-most "1" of one of the partial products in (4). That "1" is not explicitly input into the carry look-ahead circuit nor is it explicitly added with the other inputs. Rather, the fact that a "1" is to be added to the other inputs is factored into the Boolean expressions which define the values of the two sum bits, $S_1$ and $S_2$, and the carry bit C that is output by each look-ahead circuit. In a sense, then, this "1" is added with the other inputs "automatically". Specifically, the aforementioned Boolean expressions are:

$$S_1 = x_0 \oplus y_0 \oplus z_0$$

$$S_2 = (x_0 + y_0 + z_0) \oplus x_1 \oplus x_0 y_0 z_0$$

$$C = [x_0 + z_0]x_1 + y_0[x_0 z_0 + x_1]$$

where "+" denotes logical OR and "$\oplus$" denotes logical exclusive-OR. In general, the top-most input $y_0$ will be the last of the four inputs to arrive because of processing required to generate it—particularly when $y_0$ is generated by a prior look-ahead circuit. Looking at the above relation for the carry bit C, however, it will be appreciated that most of the logical operations needed to generate carry bit C—such as the ORing of $x_0$ and $z_0$—can be performed without waiting for $y_0$. When the latter finally does arrive, then, there is little extra computation to be performed and thus the delay through the circuit as a whole is minimized.

A further advantageous feature of the circuitry shown in FIG. 2 is the fact that the digits of the partial products are added from the "bottom up". This is advantageous because the value of one of the carry look-ahead inputs—the "1" added implicitly within the carry look-ahead circuit—is known a priori, which means that the carry look-ahead circuits can be implemented with less circuitry than would be the case if none of the five inputs was known. Indeed, if, by contrast, the digits of the partial products were added from the "top down", so that these "1"s would have been added at an earlier stage of the processing, the carry look-ahead circuits would, it turns out, still have to have five inputs, but the values of those five inputs would all be unknown and the carry look-ahead circuitry would be more complex.

The carry output bit of the highest-order carry look-ahead circuit is applied to a second inverter, labelled "I2", in order to generate the highest-order bit of the output product. Inversion of that bit has the effect of adding "1" to it, that "1" being the left-most partial-product bit in (4).

The foregoing merely illustrates the principles of the invention. For example, the specific circuitry shown herein is, of course, merely illustrative.

Additionally, the invention could be used in a multiplier/accumulator circuit in which the results of the multiplication are combined with a previously generated accumulated sum of such results. In that case, circuitry can be provided to add the accumulated sum, in accordance with the principles of the invention, with the currently-generated partial products to generate a new accumulated sum.

Moreover, although the invention is advantageously used to combine partial products that were generated using modified Booth encoding, such is not necessary. Indeed, the invention has general applicability to any circumstance—such as a circuit which performs straightforward multiplication of two numbers in multiplication problem (1) hereinabove—in which the sign bits of two's complement numbers that are to be combined do not "line up" vertically.

It will thus be appreciated that those skilled in the art will be able to devise numerous arrangements which, although not explicitly shown or described herein, embody the principles of the invention and are within its spirit and scope.

I claim:

1. A circuit for multiplying two numbers, said circuit comprising means responsive to said two numbers for generating a plurality of partial products in two's complement form such that the sign bit of each one of said plurality of partial products has a different positional significance from the sign bit of each other one of said plurality of partial products, and means responsive to said partial products for combining said plurality of partial products in such a way that the sign bit of each one of said plurality of partial products is replaced by two bits, the higher-order one of said two bits being 1 and the other one of said two bits being the inverse of the replaced sign bit augmented, in the case of the partial product having lowest significance, by 1.

2. Apparatus comprising means for generating at least four two's complement numbers $p_0p_1p_2p_3p_4p_5p_6p_7p_8$, $q_0q_1q_2q_3q_4q_5q_6q_700$, $r_0r_1r_2r_3r_4r_5r_6r_7r_80000$, $s_0s_1s_2s_3s_4s_5s_6s_7s_8000000$, and means for generating a final two's complement number having a value equal to the sum of said at least four numbers by combining the non-sign bits of said at least four numbers with the sign bits of said at least four numbers in such a way that each sign bit is represented by a respective pair of bits of a sign-bit-value word, the sign-bit-value word being equal to the two's complement value of the sign bits of all said at least four numbers.

* * * * *